United States Patent [19]

Gancy et al.

[11] 4,115,525

[45] Sep. 19, 1978

[54] ABSORPTIVE LOW BULK DENSITY PRODUCT FROM SODIUM SESQUICARBONATE

[75] Inventors: Alan B. Gancy; Rustom P. Poncha, both of Syracuse, N.Y.

[73] Assignee: Allied Chemical Corporation, Morris Township, Morris County, N.J.

[21] Appl. No.: 356,663

[22] Filed: May 2, 1973

[51] Int. Cl.$^2$ .................. C01D 7/14; C01D 7/37
[52] U.S. Cl. ................................. 423/425; 423/427
[58] Field of Search ............... 423/419, 421, 422, 425, 423/426, 427

[56] References Cited

U.S. PATENT DOCUMENTS

| 1,503,481 | 8/1924 | Cocksedge | 423/427 |
| 1,583,661 | 5/1926 | Cocksedge | 423/425 |
| 1,583,662 | 5/1926 | Sundstrom et al. | 423/425 |
| 3,235,329 | 2/1966 | Gancy | 423/425 |
| 3,485,578 | 12/1969 | Gould | 423/425 |

FOREIGN PATENT DOCUMENTS

| 210,628 | 2/1924 | United Kingdom | 423/427 |
| 223,015 | 10/1924 | United Kingdom | 423/427 |

Primary Examiner—O. R. Vertiz
Assistant Examiner—Gary P. Straub
Attorney, Agent, or Firm—Anthony J. Stewart; Gerard P. Rooney

[57] ABSTRACT

Conversion of sodium sesquicarbonate particles to particles of lower bulk density, as low as 180 grams per liter, with high absorption property capable of absorbing as much as 40 percent of wetting agent and with good resistance to breakage and attrition and with mild alkalinity of less than 9.9 pH to a pH approaching 9.4 without loss of particulate identity, by passing the particles through a reaction zone at a temperature of 70° to 105° C. and introducing a gas mixture containing 15-85 percent $CO_2$ and 15-80 percent water vapor and maintaining the gas mixture in contact with the particles until the particles contain at least 10 percent Wegscheider's Salt and continuing the reaction to produce particles containing 20 to in excess of 95 percent Wegscheider's Salt with a water content of less than 12 percent, said particles being characterized by being in needle-form which in turn are composed of randomly oriented Wegscheider's Salt micro needles.

6 Claims, 3 Drawing Figures

ABSORPTIVE LOW BULK DENSITY PRODUCT FROM SODIUM SESQUICARBONATE

BACKGROUND OF THE INVENTION

1. Field of the Invention

This invention relates to conversion of sodium sesquicarbonate to a lower bulk density product and to new products produced thereby.

Sodium sesquicarbonate is used in the preparation of laundry detergents which contain no phosphates. Reduction of the bulk density of the laundry detergent makes it more appealing to the consumer. More generally, a low density, soluble, mild alkalinity base which would absorb liquid wetting agents without a subsequent "bleeding" onto the packaging material is desired.

2. Description of the Prior Art

In U.S. Pat. No. 3,485,578 of Dec. 23, 1969, sodium sesquicarbonate is reduced to a bulk density of 25–42 pounds per cubic foot by heating sodium sesquicarbonate at a temperature above 100° C. and superatmospheric pressure in a sealed vessel, or by passing sodium sesquicarbonate through a heated zone maintained at atmospheric pressure and above 300° C.

SUMMARY OF THE INVENTION

An object of this invention is to provide an efficient, economical process for conversion of sodium sesquicarbonate to a lower bulk density product.

Another object is to convert sodium sesquicarbonate particles to needle-form particles which in turn are composed of micro-needles of Wegscheider's Salt ($Na_2CO_3 \cdot 3NaHCO_3$) oriented randomly within the larger form.

Other objects and advantages will be apparent from the following description and accompanying drawing.

In accordance with the present invention, sodium sesquicarbonate particles are converted to particles of lower bulk density, as low as 180 grams per liter, with high absorption property of absorbing as much as 40 percent of wetting agent and with good resistance to breakage and attrition and with mild alkalinity of less than 9.9 pH to a pH approaching 9.4 without loss of particulate identity, by continuously passing the sodium sesquicarbonate particles through a reaction zone wherein the particles are heated to a temperature within the range of 70° to 105° C., preferably 90° to 100° C., continuously introducing into the reaction zone a gas mixture containing by volume 15–85 percent carbon dioxide and 15–80 percent water vapor, and 0–45 percent inert gas such as air or nitrogen, maintaining the gas mixture containing water vapor in direct contact with the particles during the initial period of reaction until the particles contain at least 10 percent Wegscheider's Salt, and continuing the reaction with net production of water until the particles contain from 20 percent to in excess of 95 percent by weight of Wegscheider's Salt and have a water content of less than 12 percent by weight, continuously discharging the gas containing water from the reaction zone after contact with the particles, and continuously discharging the treated particles having a lower bulk density and a higher absorption property than the sodium sesquicarbonate feed from the reaction zone. The operation is best carried out under atmospheric pressure or substantially atmospheric pressure of the order of 12–25 pounds per square inch absolute although higher or lower pressure may be employed.

The sodium sesquicarbonate product in its preferred form are needle-form particles which in turn are composed of microneedles oriented randomly within the larger form, the product comprising in excess of 50 percent, desirably in excess of 85 percent, by weight of Wegscheider's Salt with from 0 to minor amounts of sodium sesquicarbonate and sodium bicarbonate, the product having a bulk density of from 12 to 25 pounds per cubic foot, a water content of less than 7.0 percent by weight and a pore volume of 0.02 to 0.42 ml/gm. (pores of 2 micron size, and smaller).

The accompanying drawing, FIG. 1, diagrammatically illustrates one method of carrying out the present invention. The charge to the process in feed hopper 1 consists of particles of sodium sesquicarbonate generally of a size in the range of about 10 to 200 mesh with more than 50 cumulative percent of the particles being retained on 40, 60 and 100 mesh, U.S. sieve size. The sodium sesquicarbonate particles from feed hopper 1 are fed through line 2 into an indirect fired rotary reactor 3 which is rotated at a slow speed of the order of 5 to 25 rpms. The rotary kiln reactor 1 is heated to maintain the temperature of the particles within the range of 70° to 105° C., preferably 90° to 100° C. Temperatures above 105° C. for any material length of time causes decomposition of the particles producing an undesired product. The reaction is unduly long at temperatures materially below 70° C.

Gases are introduced into indirect fired rotary reactor 3 through lines 11 and 4 and pass in intimate contact with the sodium sesquicarbonate particles in rotary reactor 3 and the gases then discharge through line 5. It is important that the gases contain at least 15 percent by volume water vapor, not to exceed 80 percent water vapor and also contain at least 15 percent by volume carbon dioxide up to 85 percent carbon dioxide. In the preferred operation, the water vapor is between 25 and 40 percent by volume and the carbon dioxide is between 45 and 70 percent by volume. If desired, an inert gas, such as air or nitrogen, may be included in the mixture in an amount up to 45 percent by volume. The volume percent of carbon dioxide and of water vapor each should not be below 15 percent.

Although water is released from the particles of sodium sesquicarbonate during the reaction, we have found it important to maintain an atmosphere of moisture in the gases, particularly during the initiation of the reaction, i.e., during the formation of about 10 percent Wegscheider's Salt. While we do not wish to be bound by any theory or mechanism of reaction, we believe that the moisture in the atmosphere induces the formation of microneedles of Wegscheider's Salt. During the continued reaction, particularly towards the latter end of the reaction, there is sufficient moisture generated to provide an atmosphere of moisture in the carbon dioxide gas surrounding the particles and indeed there is a net production of moisture. The gases containing excess moisture are discharged through line 5 into water cooled condenser 6 wherein the gases are cooled and surplus water condensed and discharged through line 7.

The cooled moisture containing gas from condenser 6 flows through line 8 into rotary blower 9 where it is forced through line 4 into indirect fired rotary reactor 3. Feed carbon dioxide gas enters through line 11. A portion of the gases may be discharged from the system through line 18.

At the start of the operation, moisture may be introduced into the carbon dioxide gas to ensure that the mixture of gases entering the rotary reactor 3 contains the required amount of moisture.

Sodium sesquicarbonate particles, ordinarily have an untamped bulk density of 800–850 grams per liter which is equivalent to about 50–53 pounds per cubic foot. Densities as low as 180 grams per liter, equivalent to about 11 pounds per cubic foot, have been achieved in the practice of our invention. Densities intermediate to the density of the original sesquicarbonate particles and the low value of 180 grams per liter may be obtained by varying the degree of reaction which is readily accomplished by varying the time or temperature, or both, or the concentration of carbon dioxide. The product is discharged from rotary reactor 3 through line 12 into conventional vibratory scalping screen 13 into which is introduced through line 14 drying and cooling air, and the thus dried product is passed through line 15 into cooler collector 16 where the solids settle to the bottom and the separated air is released through line 17 to the atmosphere.

Care should be taken not to "overreact" in reactor 3, because this would result in breaking down of the particles with loss of its desirable properties. The proper degree of reaction can be determined by taking samples of the product discharging from reactor 3 periodically, analyzing by X-ray diffraction for the percentage of Wegscheider's Salt and other products of reaction as well as by examination under the microscope to determine the nature of the needles composing the particle.

Normally the reaction can be completed in a period of from 10 to 35 minutes depending on the product desired and conditions of operation.

Figure 1:
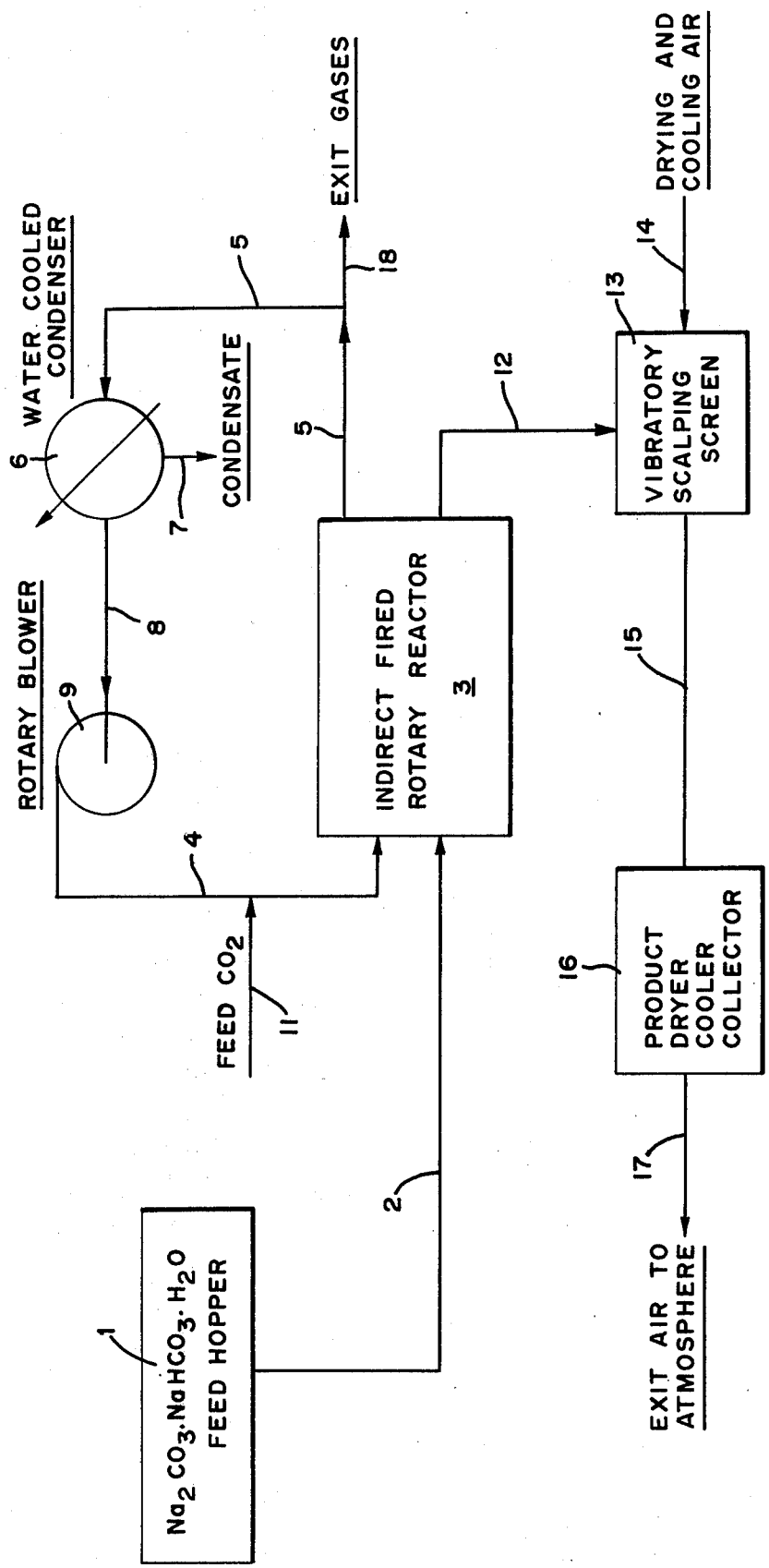
Figure 2:
FIG. 2 is a photograph (magnification 50X) of the product particles. These particles are needle-form and are in turn composed of microneedles oriented randomly within the larger form.
Figure 3:
FIG. 3 is a photograph of the sodium sesquicarbonate particles.

The chemical make-up of the product, as distinguished by X-ray diffraction, is, in general, Wegscheider's Salt plus sodium sesquicarbonate plus sodium bicarbonate. Under some circumstances, Wegscheider's Salt and sesquicarbonate only are present. If the reaction is carried to completion, Wegscheider's Salt is essentially the sole product. The reaction should ordinarily be carried out until at least 20 percent of the sodium sesquicarbonate feed is converted to Wegscheider's Salt. The bulk density will vary from about 800 grams per liter down to about 180 grams per liter. The water content will vary dependent generally on the degree of reaction from about 12 percent by weight of the water to substantially no water when Wegscheider's Salt is essentially the sole product. While in general, the demand at present is for a 200–300 gram per liter product, there is also some demand for a more dense product of the order of about 500 grams per liter. The difference in bulk density can, in general, be achieved by controlling the degree of reaction.

The pH of solutions of the product will vary depending upon the composition. The original starting material, namely, sodium sesquicarbonate, has a pH of 9.9. The product of conversion in accordance with the present invention when the reaction is carried out to produce a product close to 100 percent Wegscheider's Salt has a pH of approximately 9.4 at 25° for a 1 percent solution. Thus, the products are milder alkalies than the sodium sesquicarbonate precursor.

Friability is defined as the sum of two other entities, breakage and attrition. This is determined as follows:

A −20, plus 80 mesh portion of the sample is placed on 100 mesh screen with 50 grams of 5 mm glass beads. A 140 mesh screen and pan are placed underneath. After vibration, the portion of the sample passing through 100, and standing on the 140 mesh screen is reported as "percent breakage". The portion passing through 140 mesh is called "percent attrition".

The friability of a typical product of the present invention which is close to 100 percent of Wegscheider's Salt is 4 percent, with values ranging down to 1 percent. A higher density form of the product of the present invention of the order of 500 grams per liter gave a value of 1 percent. Precursor sodium sesquicarbonate, by contrast, gives a value of 6 percent, with individual samples ranging as low as 3 percent and as high as 10 percent. Thus, the products of the present invention are generally less friable than the starting material, sodium sesquicarbonate. This is surprising in view of the delicate Wegscheider's Salt needle microstructure of the product of the present invention. Coincidental with low friability is low dustiness.

The product porosities are pore volumes representing only part of the spectrum of pores which are revealed through mercury porosimetry whereby the sample is progressively pressured with liquid mercury as volume readings are taken. The particular part of the total spectrum constituting what we call "useful" pores was determined by measuring total porosities of various soda materials, while also measuring their tendency to "bleed" once impregnated with liquid nonionic surfactant. It was found that correlation between the two types of observation could be nicely made when considering only pore volumes of pores 2 microns in size and smaller. Evidently larger pores do not possess the capillarity required in this particular application.

As previously stated, the volume of all pores up to 2 microns in diameter is used as an indicator of useful porosity because of correlation between this arbitrarily defined value and absorption of liquid nonionic wetting agent. Under this definition sodium sesquicarbonate has a porosity of 0.00 ml/gm. The porosity of the product of the present invention ranges as high as 0.42 ml/gm. Merely as illustrative, the product having a pore volume of 0.25 ml/gm. absorbs 40 percent of wetting agent. Thus, it will be evident that the product of the present invention is an extremely unusual absorbent product.

The product of the present invention is generally coarser than its precursor, sodium sesquicarbonate. This is illustrated in the tabulation below:

| | PARTICLE SIZE DISTRIBUTION | |
|---|---|---|
| | Cumulative Percent On | |
| U.S. Sieve No. | Sodium Sesquicarbonate Precursor | Sodium Sesquicarbonate After Treatment |
| 10 | 0 | 0 |
| 40 | 6 | 35 |
| 60 | 76 | 85 |
| 100 | 87 | 98 |

The following example illustrates the present invention.

EXAMPLE 1

This operation was carried out in pilot plant apparatus in a manner similar to illustrated flow diagram, FIG.

1. The rotary kiln reactor had an internal diameter of 12 inches, a four foot length and a rotational speed of five revolutions per minute. The feed to the reactor was sodium sesquicarbonate particles having a bulk density of 800 grams per liter, a pore volume (equal to or less than 2 microns diameter) of 0.00 ml/gm., a friability of six percent and a pH of one percent aqueous solution at 25° of 9.9.

The sodium sesquicarbonate feed rate was 30 pounds per hour. The temperature at the reactor feed end was 97° C. and the temperature at the reactor discharge end was 95° C. The pressure was atmospheric. The feed gas stream consisting of 90 percent $CO_2$ and 10 percent air was introduced through line 11 into the reactor at the rate of 33.6 cu. ft. per hour. The water given off in the reaction was condensed by passing some gas from the reactor through line 5 into the condenser 6 and recycling the gas back into the reactor through line 4. 700 ml/hr. of water was condensed by recycling the gas. The concentration of $CO_2$ in the recycle gas was 70 percent on a dry basis. The ambient gas conditions in the reactor were 20% $CO_2$, 9% inerts and 71% $H_2O$.

| Product Characteristics | |
|---|---|
| Bulk density | 220 gpl |
| Pore Volume ($\leq 2\mu$) | 0.25 ml/g |
| % $NaHCO_3$ | 70.0 |
| % $Na_2CO_3$ | 28.5 |
| % $H_2O$ | 1.5 |
| -which were present in the form of | |
| % Wegscheider's Salt | 81.5 |
| % Sodium Sesquicarbonate | 9.4 |
| % $NaHCO_3$ | 9.1 |
| Screen Analysis | |
| +40 | 35.0% |
| −40, +60 | 53.0% |
| −60, +100 | 10.0% |
| −100, +200 | 1.5% |
| −200 | 0.5% |
| Friability | 4% |
| pH of aqueous solution, 25° C. | |
| 0.25% | 9.6 |
| 0.50% | 9.5 |
| 1.00% | 9.4 |

EXAMPLE 2

In this operation there is produced a higher bulk density product. The same apparatus as was used in Example 1 was employed. The conditions of operation and product characteristics are tabulated below.

| Reaction Conditions | |
|---|---|
| $CO_2$ concentration | 22.3% |
| Feed gas rate: | |
| $CO_2$     15 SCFH | |
| Air     7.4 SCFH Total | 67.3 SCFH |
| Steam     44.9 SCFH | |
| Solids Feed Rate | 30 lbs/hr. |
| Temperature, reactor feed end | 96° C. |
| Temperature, reactor discharge | 95° C. |
| Pressure | atmospheric |
| Gas recycle rate | 17.1 SCFH |
| $CO_2$ in recycle gas | 42% dry basis |
| Condensate removal rate | 650 ml $H_2O$/hr. |
| Ambient gas conditions in reactor: | |
| % $H_2O$ | 63.5 |
| % $CO_2$ | 15.5 |
| % Inerts | 21.0 |
| Product Characteristics | |
| Bulk density | 494 gpl |
| Pore volume ($\geq 2\mu$) | 0.17 ml/g |
| % $NaHCO_3$ | 47.8 |
| % $Na_2CO_3$ | 41.1 |
| % $H_2O$ | 11.1 |
| which were present in the form of | |
| % Wegscheider's Salt | 28.7 |
| % Sodium sesquicarbonate | 69.5 |
| % $NaHCO_3$ | 1.8 |
| Screen Analysis | |
| +40 | 4.3% |
| +60 | 38.7% |
| +200 | 54.7% |
| −200 | 2.3% |
| Friability | 1% |
| pH of aqueous solution, 25° C. | |
| 0.25% | 9.9 |
| 0.50% | 9.9 |
| 1.00% | 9.8 |

We claim:

1. A method for the treatment of sodium sesquicarbonate particles to product product particles having a bulk density of from 12 to 25 pounds per cubic foot and a pore volume of 0.20 to 0.42 ml/gm (pores having a diameter equal to or less than 2 microns) without loss of particulate identity which comprises passing said sodium sesquicarbonate particles through a reaction zone wherein the particles are heated to a temperature within the range of 70° to 105° C., introducing into said reaction zone a gas mixture comprising by volume 15–85 percent carbon dioxide and 15–80 percent water vapor, maintaining said gas mixture containing water vapor in direct contact with the particles during the initial period of reaction until the particles contain at least 10 percent of Wegscheider's Salt, and continuing the reaction in said reaction zone with Net production of water until the particles contain from 85 percent to in excess of 95 percent by weight of Wegscheider's Salt and have a water content of less than 12 percent by weight, discharging the gas containing water from said reaction zone after contact with the particles, and discharging said product particles from said reaction zone.

2. A method as claimed in claim 1 wherein the pressure in the reaction zone is between 12 and 25 pounds per square inch absolute.

3. A method as claimed in claim 1 wherein the particles passing through the reaction zone are heated to a temperature within the range of 90° to 100° C.

4. A method as claimed in claim 1 wherein the gas containing water discharged from the reaction zone is cooled to condense a portion of the water which is separated from the gas and the resultant gas free from a portion of the water is recycled to the reaction zone.

5. A method as claimed in claim 1 wherein the gas mixture introduced into the reaction zone contains in addition an inert gas such as air or nitrogen in an amount up to 45 percent by volume of the total gas mixture.

6. A process as claimed in claim 1 wherein the gas mixture contains by volume 45–70 percent carbon dioxide and 15–40 percent water vapor.

* * * * *